(12) United States Patent
Ji

(10) Patent No.: US 7,165,682 B1
(45) Date of Patent: Jan. 23, 2007

(54) DEFECT FREE COMPOSITE MEMBRANES, METHOD FOR PRODUCING SAID MEMBRANES AND USE OF THE SAME

(75) Inventor: Jiang Ji, Salem, NH (US)

(73) Assignee: Accord Partner Limited, Hong Kong (HK)

( * ) Notice: Subject to any disclaimer, the term of this patent is extended or adjusted under 35 U.S.C. 154(b) by 180 days.

(21) Appl. No.: 10/620,715

(22) Filed: Jul. 16, 2003

(51) Int. Cl.
 B01D 29/00 (2006.01)
 B01D 39/00 (2006.01)
 B01D 67/00 (2006.01)
 B01D 63/00 (2006.01)
 B01D 39/14 (2006.01)
 B01D 53/00 (2006.01)

(52) U.S. Cl. ............ 210/490; 210/500.23; 210/500.27; 210/500.34; 210/500.36; 210/500.43; 210/500.29; 210/500.42

(58) Field of Classification Search ........... 210/500.27, 210/490, 500.36, 500.41, 500.35, 500.42, 210/500.23, 500.29, 500.34, 500.43; 428/315.7, 428/310.5; 264/41, 216, 200; 427/244–245; 96/4

See application file for complete search history.

(56) References Cited

U.S. PATENT DOCUMENTS

| | | | | |
|---|---|---|---|---|
| 602,872 | A * | 4/1898 | Richards et al. ............. 205/342 |
| 3,556,305 | A * | 1/1971 | Shorr ......................... 210/490 |
| 3,676,193 | A * | 7/1972 | Cooper et al. ............... 427/230 |
| 4,061,821 | A * | 12/1977 | Hayano et al. ................ 428/37 |
| 4,188,354 | A * | 2/1980 | Munari et al. ............... 264/413 |
| 4,645,602 | A * | 2/1987 | Barnes et al. ................ 210/490 |
| 4,690,765 | A * | 9/1987 | Linder et al. ................ 210/654 |
| 4,690,766 | A * | 9/1987 | Linder et al. ................ 210/654 |
| 4,740,562 | A * | 4/1988 | Menke et al. ................ 525/366 |
| 4,774,039 | A * | 9/1988 | Wrasidlo ...................... 264/41 |
| 4,810,384 | A * | 3/1989 | Fabre ...................... 210/500.23 |
| 4,941,976 | A * | 7/1990 | Bartels et al. ............... 210/490 |
| 5,022,990 | A * | 6/1991 | Doi et al. ............... 210/500.42 |
| 5,032,331 | A * | 7/1991 | Onishi et al. .................. 264/48 |
| 5,066,401 | A * | 11/1991 | Muller et al. .......... 210/500.35 |
| 5,209,849 | A * | 5/1993 | Hu et al. ..................... 210/490 |
| 5,282,971 | A * | 2/1994 | Degen et al. ................ 210/645 |
| 5,418,053 | A * | 5/1995 | Lin .......................... 428/304.4 |
| 5,472,607 | A * | 12/1995 | Mailvaganam et al. ..... 210/490 |
| 5,834,107 | A * | 11/1998 | Wang et al. .............. 428/310.5 |
| 5,914,039 | A * | 6/1999 | Mahendran et al. ... 210/500.25 |
| 6,024,872 | A | 2/2000 | Mahendran et al. |
| 6,146,747 | A * | 11/2000 | Wang et al. .............. 428/310.5 |
| 6,354,444 | B1 * | 3/2002 | Mahendran et al. ........ 210/490 |
| 6,596,167 | B2 * | 7/2003 | Ji et al. .................. 210/500.42 |

* cited by examiner

Primary Examiner—Ana Fortuna
(74) Attorney, Agent, or Firm—Bromberg & Sunstein LLP

(57) ABSTRACT

A defect free semipermeable composite membrane having excellent integrity and high water permeability is provided. Said composite membrane comprises an inside support layer to provide sufficient mechanical strength; an outside barrier layer to provide selective separation; and a middle layer to provide both chemical and physical binding between said support and said barrier layer to bond them together. Three different methods for making said defect free composite membrane are discovered. These methods have been successfully utilized to produce high quality coatings and defect free composite membranes, which are independent of chemical composition and physical structure of said support. In the present invention, ultrasonic sonication is discovered to be effective to speed up the phase inversion process of a membrane casting solution, thus allows produce a composite membrane at a speed higher than those disclosed in the prior art. Said defect free composite membranes have broad applications, ranging from filtration of fruit juice, wine and milk to biotech down stream processing and purification of drinking water, municipal and industrial wastewater.

6 Claims, 7 Drawing Sheets

DEFECT FREE COMPOSITE MEMBRANES, METHOD FOR PRODUCING SAID MEMBRANES AND USE OF THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to the field of semipermeable membranes, which are useful in liquid and gas separation by filtration, dialysis and the like.

An industrial membrane should have a high permeability, sufficient mechanical strength and excellent chemical stability to give a high productivity and a long service time. The membrane chemical stability is mainly determined by chemical composition of membrane materials. Membrane permeability and mechanical strength not only depend on membrane chemical composition, but also strongly depend on membrane physical structure, which is primarily determined by the process utilized to make the membrane.

It is well know that the thinner the membrane, the higher the membrane permeability, however, the thinner the membrane, the weaker the membrane. In order to obtain both high membrane permeability and sufficient mechanical strength, a composite membrane approach has been used. In general, a composite membrane comprises a thin film layer and a support. The thin film layer (referred to herein as a membrane) provides a separation barrier, which allows lower flow resistance to increase permeability, and the support provides mechanical strength to a composite membrane.

U.S. Pat. No. 4,061,821 discloses a method of coating a hollow braid with a polyacrylonitrile solution to form a braid-supported hollow fiber membrane, which shows a higher mechanical strength and a higher stability to hot water treatment than the self-supported polyacrylonitrile membrane having no braid support.

In water treatment, a bleach containing sodium hypochlorite as a free chlorine source is often used for membrane cleaning and water disinfections. Polyacrylonitrile based membranes disclosed in U.S. Pat. No. 4,061,821 are not stable to chlorine attack. However, this problem can be overcome by using a polyvinylidene fluoride (PVDF) based membrane, which is relatively stable to free chlorine attack. U.S. Pat. No. 5,472,607 discloses a method of coating a tubular braid with a PVDF solution to form a braid reinforced hollow fiber membrane. The PVDF solution only coats the outside surface of the braid without penetrating into the braid wall. The membranes obtained are stable to 2000 ppm of free chlorine at ambient temperature. Unfortunately, the membranes disclosed in U.S. Pat. No. 5,472,607 have very low water permeability. U.S. Pat. No. 5,914,039 to the same inventors discloses a method, in which partially hydrolyzed poly(vinyl acetate) and calcined α-alumina particles are added to a braid supported PVDF membrane, which shows a higher pure water permeability than the corresponding membrane having no calcined α-alumina particles. However, this membrane shows a severe fouling problem in wastewater treatment, because the calcined a-alumina particles in the membrane are excellent absorbents, which have very large surface area and a high tendency to absorb impurities from feed solutions to reduce membrane flux. To minimize the membrane fouling problem, the above membrane is operated under frequent back flush, which is often found to cause membrane delaminated, i.e. the membrane is peeled off the braid surface by back flush. A variety of materials, such as polyester, fiber glass and nylon, are used to make a tubular hollow braid. It is found that fiber glass braid shows a more severe membrane delamination problem than polyester and nylon braids due to poor membrane adhesion to the surface of fiber glass braid. U.S. Pat. No. 6,354,444 discloses a physical method to tackle membrane delamination problem, i.e., using different type of braid as a membrane support, which has different braiding patterns, such as regular, hercules and diamond. It is found that the diamond braid having tighter weaves than the regular and hercules braids gives an improved membrane adhesion. However, the membrane delamination problem remains.

In the prior art, the coating quality strongly depends on the braid quality. For example, broken fibers protruding from the surface of tubular braid caused an uneven coating around the broken fibers to form pin holes. According to U.S. Pat. No. 6,354,444, a braid used as a membrane support must have proper weaves. Too open weave causes the filament (fiber) embedded by a polymeric coating material to give a low membrane permeability, and too tight weave causes poor membrane adhesion to the braid surface, the membrane is often found to be peeled off the braid surface by back flush.

Furthermore, the membrane casting solutions in the prior art is unstable and difficult to make to give a poor reproducibility. For example, a hydrophilic component (HPVA) used in a membrane casting solution in U.S. Pat. Nos. 5,472,607, 5,914,039, and 6,354,444 is made by a partial hydrolysis of poly(vinyl acetate). Concentrated sulfuric acid is used as a catalyst, the reaction is carried out over a long time period at an elevated temperature. The degree of hydrolysis is very difficult to control, and varies from batch to batch. U.S. Pat. No. 6,024,872 discloses a method of making a dope containing calcined α-alumina particles, which causes an even more severe problem than the partial hydrolysis of poly(vinyl acetate), because the calcined α-alumina particles are partially precipitated out of the membrane casting solution during storage, the degree of precipitation varies with time, resulting in a non uniform coating and poor membrane reproducibility.

The highest speed disclosed in the prior art for coating a braid is 40 ft/min, it is relatively low and should be improved for a higher productivity.

The present invention is designed to resolve the problems in the prior art.

SUMMARY OF THE INVENTION

It is an object of the present invention to provide a defect free semipermeable composite membrane having its barrier layer strongly bonded to the support.

It is another object of the present invention to provide method, which can strengthen the binding between the barrier layer and the support of a composite membrane to prevent the membrane from peeling off the support during back flush cleaning.

It is another object of the present invention to provide a spinneret, which has a multiple inlets allowing simultaneously coating a tubular support with multiple layers to give a defect free composite membrane.

It is another object of the present invention to provide an effective coating method to give a high quality coating and a defect free membrane, which is independent of chemical composition and physical structure of the support, especially, independent of braiding patterns, such as regular, hercules and diamond.

It is another object of the present invention to make a stable and reproducible membrane casting solution under a mild condition, which can give a hydrophilic high flux membrane.

It is another object of the present invention to provide a method, which can enhance mass transfer and speed up phase inversion of a membrane casting solution to produce a composite membrane at a speed higher than those disclosed in the prior art.

It is further object of the present invention to demonstrate a method of utilizing the defect free semipermeable composite membranes.

It has been discovered in the present invention that a composite hollow fiber membrane has a high water permeability, and strong physical and chemical binding between the membrane and the support, the membrane does not burst or peel off the support under a back pressure higher than 100 psi. In the present invention, the binding between the membrane and the support of a composite hollow fiber membrane is strengthened by two different methods: (1) adding a permeable adhesive layer between the membrane and the support to bind them together during membrane formation; and (2) applying an adhesive from the support side of a composite membrane after it is formed to bind the membrane and the support together. In contrast to the physical attachment in the prior art, the above two methods in the present invention provide chemical binding and physical adhesion between the membrane and the support.

According to the present invention, a new type of spinneret is disclosed, which has at least two inlets to provide different coating solutions for simultaneously coating a support with multiple layers to form a composite hollow fiber membrane. In the present invention, a strong tubular support, such as braid, knitted tube, and extruded hollow fiber, is used to provide mechanical strength. The tubular support is coated with multiple layers when passing through the spinneret. The first coating solution could be an adhesive, such as epoxy, polyurethane and silicone, or any other solution, which has excellent compatibility with both the support and the second coating solution to bond them together to prevent the membrane from delamination. The first coating solution may or may not be the same as the second coating solution.

According to the present invention, a method is disclosed for providing a high quality coating on a variety of supports. In contrast to the prior art, a high quality coating obtained in the present invention is independent of chemical composition and physical structure of support. This is achieved by simultaneously coating a support with multiple layers. The first coating layer not only covers all the defects and roughness of the support, including broken filament protruding from the support surface, but also provides a smooth surface and strong adhesion for a second coating layer, which is formed by coating on top of the first layer in a single step to give a high quality coating, which is in turn solidified in a coagulation bath to form a composite membrane.

According to the present invention, a method is disclosed to make a stable membrane casting solution, which comprises a hydrophobic polymer as a major component, a hydrophilic polymer as a minor component and both inorganic and organic additives as pore formers. The hydrophobic polymer provides the membrane with excellent chemical stability, the hydrophilic polymer provides a hydrophilic surface property and both the inorganic and organic pore formers provide high porosity. In contrast to the prior art, there are no hydrolysis of poly(vinyl acetate) and no calcined α-alumina particles in the present invention, thus the membrane casting solution obtained is very stable during storage. It gives a much better control in coating quality and reproducibility than the prior art. The use of a commercially available hydrophilic polymer allows avoid the time consuming hydrolysis reaction used in the prior art, reduce manufacturing cost and increase productivity.

Furthermore, in the present invention the ultrasonic sonication is utilized in the coagulation bath, primary and secondary leaching baths to enhance mass transfer and to speed up phase inversion. The use of ultrasonic sonication allows produce a composite membrane at a speed higher than that disclosed in the prior art.

BRIEF DESCRIPTION OF THE DRAWINGS

The present invention can be illustrated with the assistance of the following drawings.

DETAILED DESCRIPTION OF THE INVENTION

The present invention has a number of features, which are more advanced than the prior art. These advances are described in details in this section and defined in the appended claims.

Figure 1:
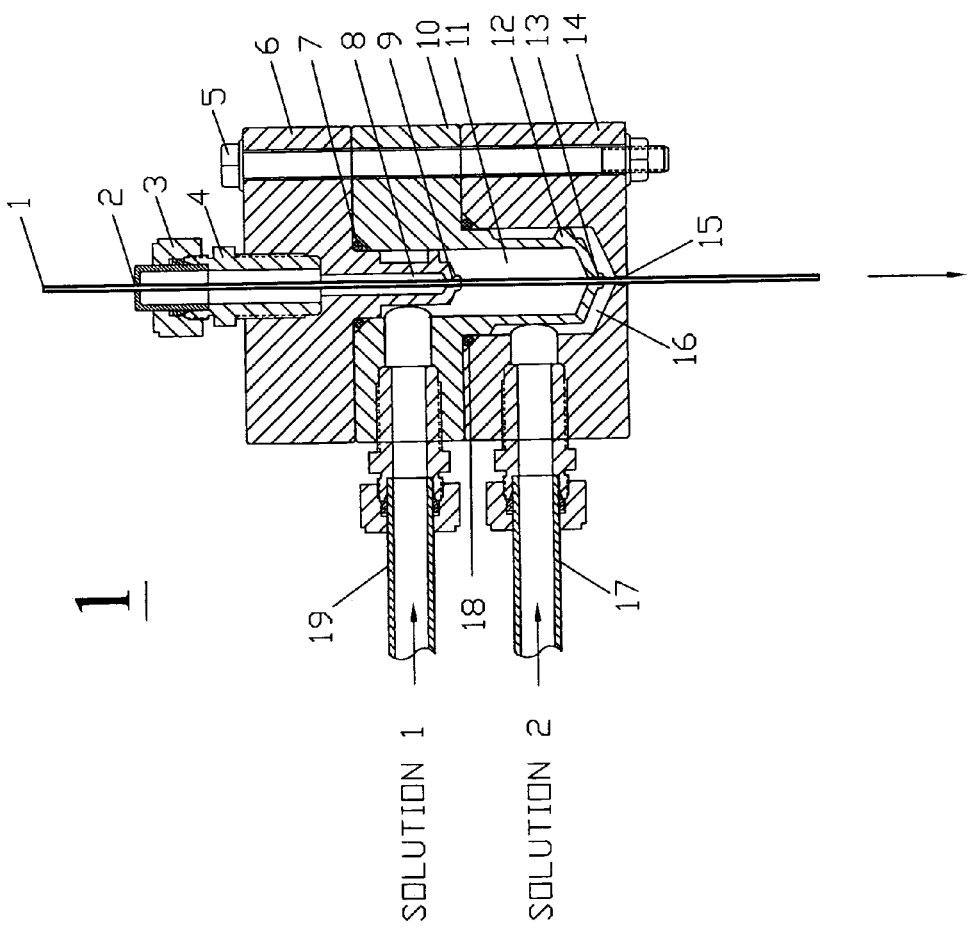
FIG. 1 is the drawing of a new type of spinneret of the present invention.

According to the present invention, a novel composite hollow fiber membrane is obtained by coating a tubular support with multiple layers using a special designed spinneret 1 as shown in FIG. 1. The spinneret has two inlets 17 and 19, for two different coating solutions. A tubular support 1 enters the spinneret through a small hole 2 located at the top of the spinneret, and hole 9 in the middle. Both hole 2 and 9 play a role in controlling the tension and alignment of support 1. A tubular support may deform during shipment and storage to give an oval cross section, hole 2 and 9 can make the deformed tubular support restored to its original circular shape. When the support 1 passes through a small hole 9, it is coated with the first coating solution in chamber 11. The first coating solution could be an adhesive, such as epoxy, polyurethane, and silicone, or a polymer solution, which has excellent compatibility with both the support and the membrane to bond them together. After passing through another hole 13, the support coated with the first coating solution is in turn coated with the second solution in chamber 16. The coating thickness is controlled by hole 15. The first coating solution may or may not be the same as the second coating solution depending on desired membrane performance.

Figure 2:
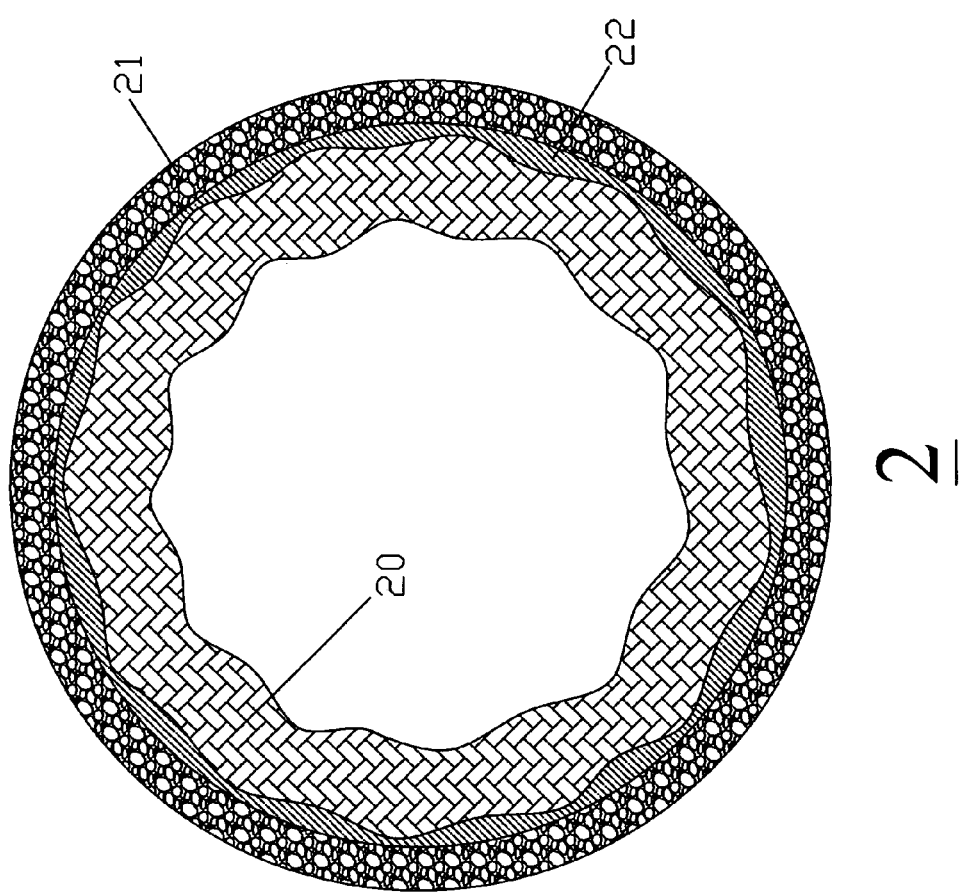
FIG. 2 is the cross section view of a composite hollow fiber membrane of the present invention.

A typical cross section view 2 of a composite membrane obtained in the present invention is schematically shown in FIG. 2. It comprises three different layers. Inside layer 20, represents a porous support, which could be a braid, knitted tube, extruded hollow fiber and any other hollow tubular material, which has either smooth or rough surface. The support layer provides mechanical strength to a composite membrane. Outside layer 21 represents a membrane, which provides a barrier for separation. Middle layer 22 represents a permeable binding layer, which could be an adhesive, such as epoxy, polyurethane, silicone, and any other chemical, which provides binding between the support and the membrane. The beauty of multiple coating layers in the present invention is that the first coating layer not only can cover the surface roughness and defects that the support may have to provide a smooth surface for second coating, but also can provide binding between the support and the membrane. The first coating layer is porous and has negligible resistance to liquid permeation. If the first and the second coating layers are made from the same coating solution, the interface between them is disappeared.

Figure 3:
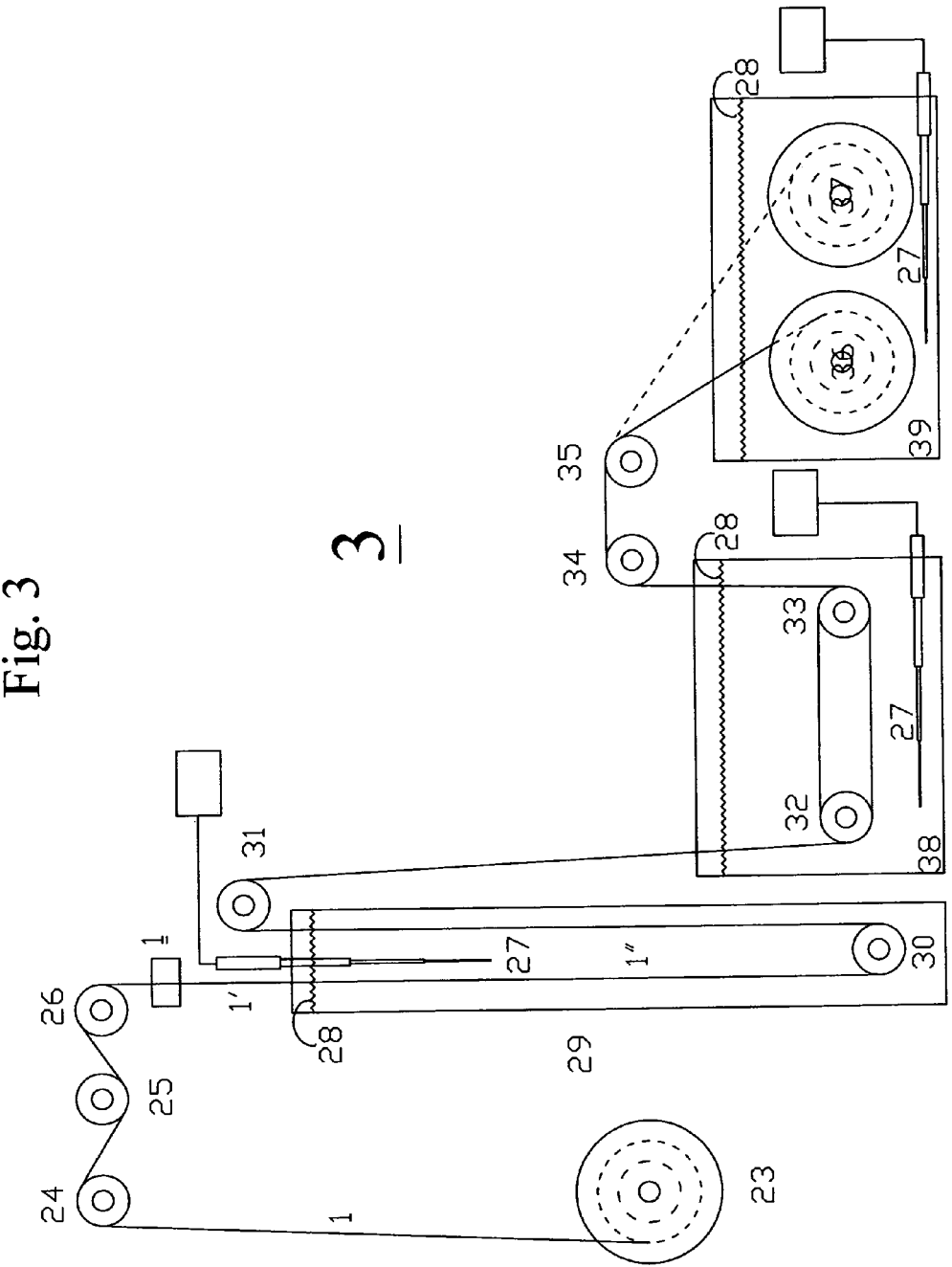
FIG. 3 is the schematic illustration of a novel process for making a composite membrane in the present invention.

A system utilized for coating a tubular support to form a composite hollow fiber membrane is schematically shown in FIG. 3. The fiber coating system comprises a fiber unwound station 23, a set of rollers 24–26, a spinneret 1, a coagulation (gelation) bath 29, a primary leaching bath 38, a secondary leaching bath 39, a set of motorized rollers 30–35, and two fiber take-up wheels 36 and 37, immersed in the secondary leaching bath 39. An ultrasonic sonicator is installed in the coagulation bath 29. It can also be installed in the primary and secondary leaching baths, but it is optional depending on needs. A laser scan micrometer can be installed between roller 34 and 35 to monitor fiber diameter during membrane formation. According to the present invention, a process for producing a composite membrane comprises preparing a homogeneous coating solution containing 8–60% by weight of hydrophobic polymers and 1–40% by weight of hydrophilic polymers, 1–20% by weight of inorganic additives, 1–20% by weight of other organic additives, and the remaining solvent, coating a support with a viscous liquid, which is selected from the group consisting of said homogeneous polymer coating solution, epoxy, polyurethane, silicone, monomer and any other adhesive, to cover the rough surface and defects of said support and to provide a smooth surface and binding for a second coating, coating said support again with either the same solution used for the first coating or a different coating solution containing polymers and monomers which can react with the monomers in the first coating layer, coagulating said polymer coating layers on top of said support to form a defect free composite membrane in a coagulation bath equipped with an ultrasonic device, which generates ultrasonic vibration to enhance mass transfer and to speed up phase inversion from liquid to solid phase of said coating layers, removing said solvents and additives from said coagulated membrane in a leaching bath equipped with an ultrasonic generator to enhance mass transfer, controlling and monitoring coating thickness and coating quality by laser sensor and sending feedback to dope delivery system to control dope delivery rate according to detected membrane thickness, collecting said composite membrane at a speed of 5 to 600 feet per minute with a take-up wheel immersed in a water bath equipped with an ultrasonic sonicator to remove chemical residuals from said membrane, switching to another take-up wheel when one wheel is full to continue collecting said membrane, switching membrane collection between two take-up wheels allows a continuous production around clock, curing said membrane either at ambient temperature or at an elevated temperature depending on the adhesives utilized to bond said support and said membrane together, optionally treating said composite membrane with a bleach containing 100–120,000 ppm free chlorine at ambient or elevated temperature to increase membrane water permeability by 2 to 10 folds compared to a control membrane never exposed to a chlorine treatment.

A general process for making a composite hollow fiber membrane is also illustrated in FIG. 3. A tubular support 1 in the present invention could be a tubular braid, knitted tube, extruded hollow fiber and any other material having a tubular geometry. For an illustration purpose, a hollow tubular braid is used as an example. Hereafter, the support 1 in FIGS. 1 and 3 is referred to a hollow tubular braid, or braid for brevity. A braid 1 from spool 23 is guided through a set of rollers 24–26, which control braid tension prior to coating. A tubular braid 1 is coated by two polymer solutions when passing through spinneret 1. A detail illustration of coating process inside the spinneret is given in FIG. 1. When the braid 1 passes through a small hole 9, it is coated in chamber 11 by the first coating solution, which could be an adhesive, such as epoxy, polyurethane, and silicone, or a polymer solution, which has excellent compatibility with both the braid and membrane to bond them together. In Example 1, the first coating solution is the same as the second coating solution. In Example 2, the first coating solution is a proprietary adhesive specially formulated for strengthening the binding between the membrane and the support. The adhesive layer covers all the defects of the braid, including broken filament protruding out of the braid surface. The first coating provides a smooth surface and strong binding for the second coating. After passing through hole 13, the adhesive coated braid is in turn coated with the second coating solution in chamber 16 of spinneret 1. In Examples 1–4 of the present invention, the second coating solution contains a fluoro polymer as a major component and a hydrophilic polymer as a minor component. The coating thickness is controlled by hole 15. The polymer coated braid is allowed travel a very short distance, such as 4 inches, in air before entering coagulation bath 29, where polymer phase inversion from liquid to solid takes place to form a composite hollow fiber membrane. An ultrasonic probe 27, which can generate ultrasonic vibration, is installed in coagulation bath 29 to enhance mass transfer between the coagulation media and newly formed membrane to efficiently remove solvent and additives from the membrane. The solidified membrane is transferred from coagulation bath 29 into a primary leaching bath 38 via a roller 31 above gelation bath 29. The primary leaching bath 38 has two motorized rollers 32 and 33. The fiber is wrapped two dozen times around two parallel rollers 32 and 33 to leach the residual solvent and additives out of the membrane. Then, the fiber is allowed pass over roller 34 and 35 and is finally collected by a take-up wheel immersed in water in a secondary leaching tank 39, the remaining chemical residuals are removed from the membrane at this stage. A laser scan micrometer can be installed between roller 34 and 35 to monitor fiber size and reproducibility. The signal obtained from the laser scan micrometer can be sent back to the dope delivery system to control dope delivery rate. Ultrasonic probes can be installed in both the primary and the secondary leaching bath 38 and 39, respectively. The ultrasonic probe installed in the coagulation bath 29 has significantly enhanced mass transfer and speeded up the phase inversion from liquid to solid during membrane formation. Thus, a composite hollow fiber membrane in the present invention can be produced at a speed much faster than that disclosed in the prior art.

Example 1 illustrates a basic process for making a braid supported hollow fiber membrane in the present invention.

A membrane casting solution (referred to herein as Dope I) is made by dissolving 13 parts by weight of PVDF, 5 parts by weight of polyvinylpyrrolidone (PVP), 5 parts by weight of aluminum chloride hexahydrate ($AlCl_3.6H_2O$), and 2 parts by weight of poly(vinyl butyral-co-vinyl alcohol-vinyl acetate) in 75 parts by weight of 1-methyl-2-pyrrolidinone (NMP) as a solvent. The dope obtained is clear, stable and viscous.

A composite hollow fiber membrane is prepared by coating a braid twice with Dope I using a process shown in FIG. 3. A braid used as a membrane support has a tubular geometry and a curved surface, its cross section 20 is schematically shown in FIG. 2. The first coating 22 covers the rough surface of braid and provides a smooth surface for a second coating as displayed in FIG. 2. The second coating 21 seals any defect that the braid may still have after the first coating to form a defect free composite membrane as shown in FIG. 2. The use of the same dope for both the first and second coating allows eliminate the interface between the first and second coating layers.

In Example 1, ultrasonic sonication is applied to the coagulation bath to enhance mass transfer and to speed up phase inversion process. A composite hollow fiber membrane is produced at a speed of 60 ft/min. A composite membrane obtained has an outside diameter of 78 mil, a water permeability of 50 gfd/psi measured at 10 psi transmembrane pressure.

The membrane burst pressure is defined as the pressure at which the membrane is ruptured. This parameter is very important, because the membrane is often cleaned by back flush, the membrane may delaminate (i.e., peel off) from the support if the membrane burst pressure is lower than the pressure applied for back flush cleaning. The composite hollow fiber membrane obtained from Example 1 has a burst pressure of 40 psi, it is not very high, but sufficient for most of filtration applications.

Figure 4:
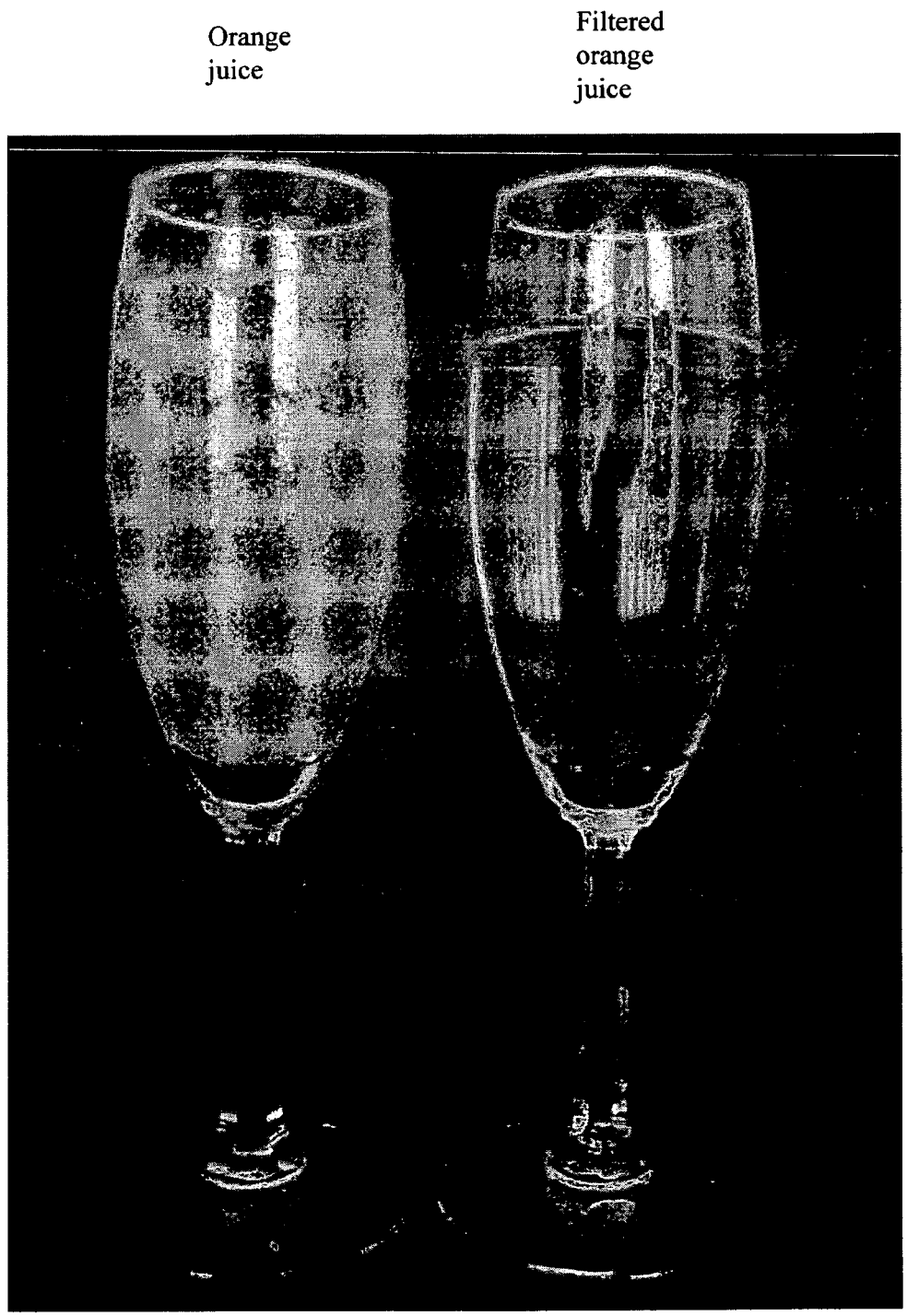
FIG. 4 is the filtered and concentrated orange juice.
Figure 5:
FIG. 5 is the filtered and concentrated lemon juice.

The membrane obtained from Example 1 is useful for a variety of applications, such as water purification and filtration of white wine, red wine, orange and lemon juice. The 100% orange juice containing suspended particles, which is sold in a local supermarket under a brand name of Tropicana Pure Premium, is filtered by the membrane to give a yellow retentate (concentrate) and clear filtrate (permeate) as shown in FIG. 4, the filtrate is full of aroma and less sweet than the original 100% juice to become a delicious diet orange juice. A similar result is obtained from filtering concentrated lemon juice containing suspended particles to give a clear permeate and white cloudy concentrate as shown in FIG. 5, the filtrate is a delicious diet lemon juice.

Figure 6:
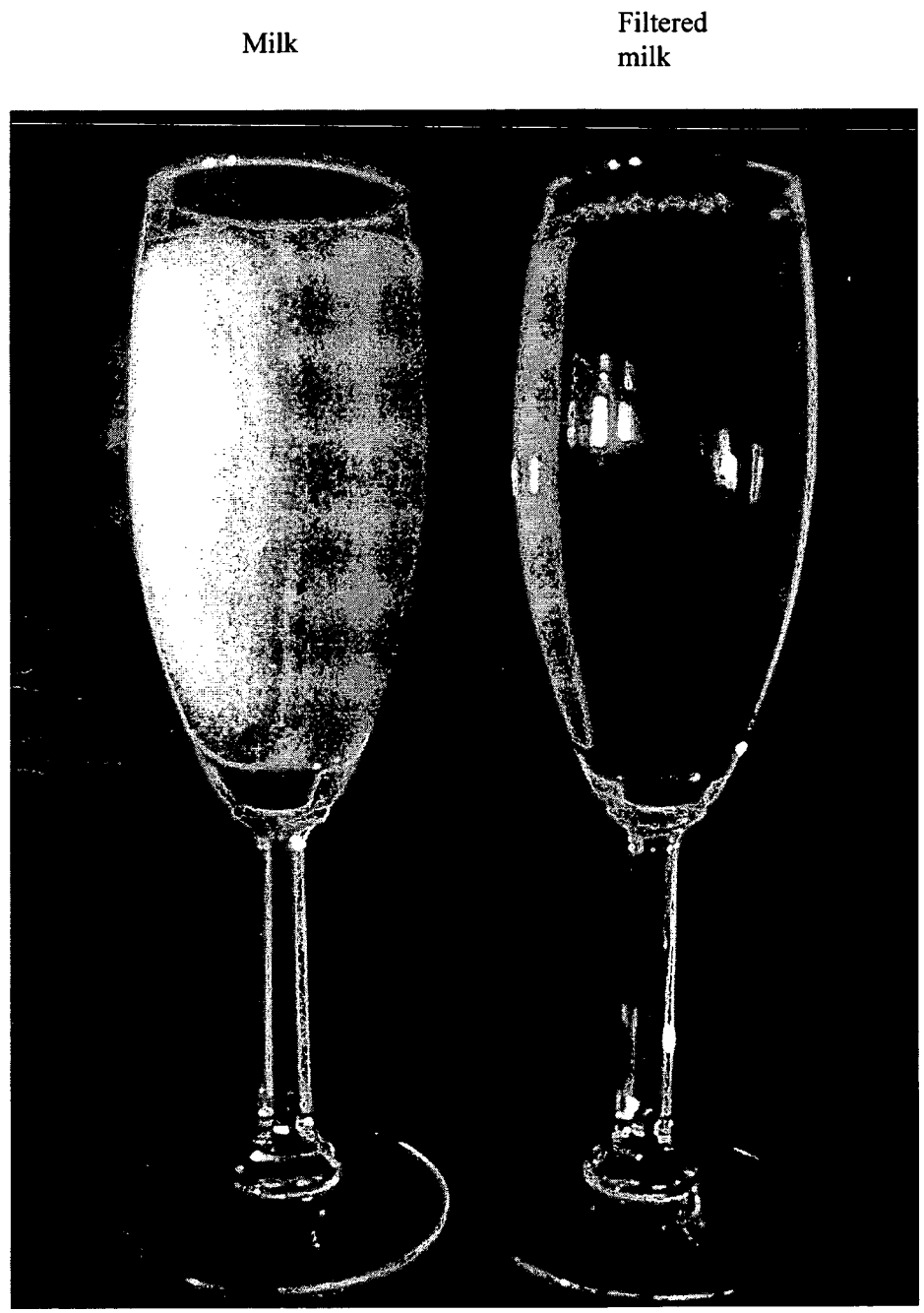
FIG. 6 is the filtered and concentrated milk.
Figure 7:
FIG. 7 is the filtered and concentrated soymilk.

The membrane obtained from Example 1 can be utilized for concentration of milk and soymilk. Whole milk obtained from a local supermarket is filtered to give a clear permeate as shown in FIG. 6. Casein and other emulsified components in milk are retained by the membrane, sucrose, water and ash are allowed pass through the membrane, the concentrated milk obtained can be used to make cheese and other dairy products. A similar result is obtained when filtering soymilk sold in a local supermarket under a brand name of Silk, the filtrate obtained is a light yellow clear solution, the retentate obtained is a white milky solution as shown in FIG. 7.

The surface water obtained from Canobie Lake, Salem, N.H., is filtered with the membrane obtained from Example 1 to give a potable water, which is as clear as a purified bottled water purchased from a local supermarket. The unfiltered Canobie Lake water is darker than both the filtered water and the bottled water because the Lake water contains suspended particles and other soluble impurities. For comparison, the inventor drinks a glass of filtered Canobie Lake water and a glass of pure water purchased from a local supermarket, no difference in taste is detected.

Sewage water obtained from a local sewer system, which has a black color and stinky smell, is filtered with the membrane obtained from Example 1. The filtered sewage water is as clear as the drinking water, has no odor and is dischargeable.

The membrane obtained from Example 1 was further utilized to filter white and red wine. In order to mimic unfiltered wine, green grape and Italian white wine, BELLA SERA PINOT GRIGIO, was blended together with a kitchen blender to give a wine mixture containing suspended grape particles. The wine mixture was filtered with membrane to give a white wine permeability of 26.3 gfd/psi and a filtered sparkling white wine which looks identical to the bottled wine, the suspended grape particles are completely removed from the wine by membrane filtration.

Similarly, red grape and French red wine, BARTON & GUESTIER MERLOT, was blended together with a kitchen blender to give a red wine mixture containing grape particles, which was filtered with the membrane to give a red wine permeability of 7.9 gfd/psi and a filtered sparkling red wine, which looks identical to the bottled wine, indicating that the membrane has a right pore size to let red pigment of the red wine freely pass through the membrane while removing the suspended grape particles from the red wine.

A post treatment is carried out by immersing the membrane obtained from Example 1 in an aqueous solution containing 10,000 ppm sodium hypochlorite at ambient temperature for 48 hours. After this post treatment, pure water permeability is increased from 50 to 141 gfd/psi, Canobie Lake water permeability increased from 32 to 38 gfd/psi, and sewage water permeability increased from 11 to 19 gfd/psi. No difference in permeate quality is detected compared to those obtained from the untreated membrane.

Example 2 illustrates an impact of adding an adhesive layer between the support and the membrane on membrane performance, in particular on membrane burst pressure, which is a critical parameter to evaluate membrane integrity.

In example 2, a braid is first coated with a proprietary adhesive specially formulated for strengthening binding between the braid and the membrane, then coated with Dope I obtained from Example 1 using a spinneret shown in FIG. 1 and a process depicted in FIG. 3 to give a composite hollow fiber membrane which has three different layers as schematically shown in FIG. 2. The inside thick layer 20 represents the braid, the middle thin layer 22 represents the adhesive, and the outside layer 21 represents the membrane. The membrane obtained is treated at 80° C. for 8 hours to give a burst pressure of 82 psi, which is about twice as high as that of the membrane (control) obtained from Example 1. Compared to the control obtained from Example 1, adding an adhesive layer between the braid and the membrane resulted in a lower water permeability of 17 gfd/psi.

The application of the adhesive reinforced membrane is illustrated by filtering whole milk to give white concentrated milk and a clear permeate similar to those shown in FIG. 6, the membrane has a milk permeability of 1.2 gfd/psi.

A post treatment with 10,000 ppm sodium hypochlorite aqueous solution at ambient temperature increases the water permeability from 17 to 42 gfd/psi. This chlorine treated membrane is utilized to filter surface water from Canobie Lake to give a water permeability of 18 gfd/psi and clear filtered water, which is potable. The adhesive reinforced membrane is also used to filter sewage water to give a sewage water permeability of 8 gfd/psi, the filtered sewage water is as clear as drinking water and is dischargeable.

The beauty of adding an adhesive layer between the support and the membrane is that the adhesive layer not only covers the defects and roughness at braid surface as shown in FIG. 2 to provide a smooth surface for the second coating, but also strengthens the binding between the support and the membrane.

An alternative approach to strengthen the binding between the membrane and the support is illustrated in Example 3.

The composite hollow fiber membrane obtained from Example 1 is filled with a proprietary adhesive for a short time period to impregnate the braid and the membrane from inside. The excess amount of adhesive is removed from the membrane. The membrane impregnated with adhesive is heated at 80° C. for 8 hours. The composite membrane obtained from Example 3 has an outside diameter of 78 mil. The adhesive reinforced membrane does not rupture when applying 100 psi pressure from the inside of membrane, indicating that the membrane has a burst pressure at least 100 psi which is much higher than that of the control obtained from Example 1. Consequently, the water permeability is reduced from 50 to 20 gfd/psi compared to the control.

The application of the adhesive reinforced membrane is illustrated by filtering whole milk to give a white milk concentrate and a clear permeate similar to those shown in FIG. 6, the membrane has a milk permeability of 1.2 gfd/psi measured at 10.0 psi transmembrane pressure.

A post treatment with 10,000 ppm sodium hypochlorite aqueous solution at ambient temperature for 48 hours increases pure water permeability from 20 to 55 gfd/psi. This chlorine treated membrane is used to filter Canobie Lake water to give clear potable water and a water permeability of 22 gfd/psi. The filtered Canobie Lake water is as clear as the purified bottled water, and is potable. The chlorine treated membrane is also used to filter sewage water to give a sewage water permeability of 12 gfd/psi. The filtered sewage water is as clear as drinking water, and is dischargeable.

The advantage of the approach illustrated by Example 3 to reinforce the membrane with an adhesive over the approach demonstrated by Example 2 is that the former allows reinforce the membrane after a membrane cartridge is made, the access amount of adhesive can be recovered and reused, the latter may cause adhesive ingredients leached into rinsing water during membrane manufacturing, additional precaution and effort have to be made to address environmental concerns in the latter approach. However, the latter is a more efficient approach than the former because the adhesive is applied during membrane formation, and no additional step is needed to apply the adhesive.

Example 4 further illustrates the impact of multiple layer coating on membrane performance using a dope containing poly(vinylidene fluoride-co-hexafluropropylene) (PVDF-HPF). PVDF-HFP is more stable than PVDF, because PVDF-HFP is stable to pH 14, while PVDF is only stable to pH 12.

In Example 4, the first coating is intended to cover surface roughness, to seal any defect that the braid may have, and to provide a smooth surface for a second coating. The second coating is expected to give a perfect defect free membrane. A membrane casting solution (Dope II) is made by dissolving 14 parts by weight of PVDF-HPF, 5 parts by weight of PVP, 5 parts by weight of aluminum chloride hexahydrate ($AlCl_3.6H_2O$), and 2 parts by weight of poly(acrylonitrile-co-vinylidene chloride-co-methylmethacrylate) in 74 parts by weight of NMP as a solvent. The dope obtained is clear, stable and viscous. A composite hollow fiber membrane is prepared using a spinneret shown in FIG. 1 and a process depicted in FIG. 3. A braid is first coated with Dope II in chamber 11 of the spinneret to cover rough surface and any defect that the braid may have. The braid covered with the first coating layer is coated again with the same dope in chamber 16 of the spinneret to give defect free composite hollow fiber membrane. The ultrasonic sonication is applied to the coagulation bath to speed up phase inversion process, which allows produce a composite hollow fiber membrane at a speed of 100 ft/min. The ultrasonic sonication is also applied to the primary and secondary leaching baths to remove chemical residuals from the membrane.

A composite membrane obtained from Example 4 has an outside diameter of 78 mil, a burst pressure of 36 psi, a water permeability of 26 gfd/psi measured at 10 psi transmembrane pressure, and a rejection of 90% towards poly(ethylene oxide) molecular weight marker having an average molecular weight of 200,000 daltons.

The applications of the membrane are demonstrated by filtering lemon juice, orange juice, milk, and soymilk. The membrane shows excellent performance in filtration of orange and lemon juice and in concentration of milk and soymilk, the details are given in Table 4 of the present invention.

A post treatment with 10,000 ppm sodium hypochlorite aqueous solution at ambient temperature increases the water permeability from 26 to 51 gfd/psi. This chlorine treated membrane is utilized to filter surface water from Canobie Lake to give a lake water permeability of 27 gfd/psi, the filtered lake water is as clean as pure water and is potable. The chlorine treated membrane is also used to filter sewage water to give a sewage water permeability of 10 gfd/psi, the filtered sewage water is as clean as the municipal drinking water and is dischargeable.

The beauty of simultaneously coating the support twice with the same dope is to completely eliminate the defect from the membrane without adding extra cost to manufacturing compared to a single layer coated membrane in the prior art. The membrane obtained from Example 4 shows excellent performance in purification of drinking water and wastewater and in filtration of milk, soymilk, lemon juice, orange juice and other fruit juice.

The use of a commercially available poly(vinyl butyral-co-vinyl alcohol-vinyl acetate) in the present invention to provide hydrophilicity to the membrane allows avoid the time consuming hydrolysis reaction of poly(vinyl acetate) in the prior art. The use of aluminum chloride hexahydrate and polyvinylpyrrolidone in the present invention to provide the membrane with high porosity allows avoid the dope instability problem caused by precipitation of calcined α-alumina particles in the prior art. The use of ultrasonic sonication in the present invention to speed up phase inversion of a membrane coating solution from liquid to solid allows produce a composite hollow fiber membrane at a speed higher than those disclosed in the prior art. The use of multiple-layer coating method in the present invention allows produce a strong, durable and defect free composite membrane. Therefore, the present invention produces more superior composite membranes and provides more advanced processes for making said composite hollow fiber membranes than the prior art.

The following examples illustrate the present invention in details and are not intended to limit the same.

EXAMPLE 1

Effect of Multiple Coatings on Membrane Performance

All of the chemicals used were purchased from Aldrich Chemicals Inc., Milwaukee, Wis. 53201. A tubular braid used as a membrane support was purchased from Atkins & Pearce Inc. One Braid Way, Covington, Ky. 41017.

A membrane casting solution (referred to herein as Dope I) was prepared by dissolving 13 parts by weight of poly (vinylidene fluoride) (PVDF), 5 parts by weight of polyvinylpyrrolidone (PVP), 5 parts by weight of aluminum chloride hexahydrate ($AlCl_3.6H_2O$), and 2 parts by weight of poly(vinyl butyral-co-vinyl alcohol-vinyl acetate) in 75 parts by weight of 1-methyl-2-pyrrolidinone (NMP) as a solvent.

A composite hollow fiber membrane was prepared by coating a tubular braid purchased from Atkins & Pearce Inc. with the above dope using a spinneret shown in FIG. 1 and a process depicted in FIG. 3. Ultrasonic sonication was applied to the coagulation bath using a sonicator, Model VCX, made by Sonic and Materials Inc. 53 Church Hill Road, Newtown, Conn., to speed up phase inversion process. The braid was coated at a speed of 60 ft/min, coagulated and leached at 50–55° C. in water to give a composite hollow fiber membrane, which was collected by a take-up wheel immersed in water at ambient temperature.

The membrane obtained above was characterized by measuring its diameter, water permeability, and filtration of wine, milk, soymilk, orange juice, lemon juice, surface water, and sewage water. All filtration tests were conducted at ambient temperature, 10 psi transmembrane pressure, and outside-in flow mode, i.e. a liquid was allowed to flow from outside the hollow fiber membrane into its lumen to give a permeate. The orange juice, lemon juice, milk and soymilk were purchased from a local supermarket. The surface water was obtained from Canobie Lake, Salem, N.H. Sewage water was obtained from a local septic in Salem, N.H. The results obtained are summarized in Table 1.

The composite hollow fiber membrane obtained has an outside diameter of 78 mil, a water permeability of 50 gfd/psi measured at 10 psi transmembrane pressure.

The membrane was used to filter 100% orange juice, which contains suspended fiber-like particles and is sold under a brand name of Tropicana, Pure Premium, the membrane gave an orange juice permeability of 0.88 gfd/psi and a clear light yellow colored permeate as shown in FIG. 4.

The lemon juice concentrate containing suspended particles was filtered by the membrane, to give a lemon juice permeability of 1.1 gfd/psi and a clear permeate as shown in FIG. 5.

The whole milk purchased from Market Basket was filtered by the membrane to give a milk permeability of 0.77 gfd/psi and a clear permeate as shown in FIG. 6.

The soymilk was filtered by the membrane to give a soymilk permeability of 0.79 gfd/psi and a clear light yellow colored permeate as shown in FIG. 7.

The membrane was used to filter the surface water obtained from Canobie Lake to give a water permeability of 32 gfd/psi, and a clean potable water.

The membrane was used to filter sewage water to give a sewage water permeability of 11 gfd/psi and a clean dischargeable water.

The membrane was used to filter white and red wine. In order to mimic unfiltered wine, green grape and Italian white wine, BELLA SERA PINOT GRIGIO, was blended together using a blender to give a wine mixture containing suspended grape particles. The wine mixture was filtered with membrane to give a white wine permeability of 26.3 gfd/psi and a filtered sparkling white wine. Similarly, red grape and French red wine, BARTON & GUESTIER MERLOT, was blended together to give a red wine mixture containing grape particles, which was filtered with the membrane to give a red wine permeability of 7.9 gfd/psi and a filtered sparkling red wine.

A post treatment was carried out by immersing the membrane in a 10,000 ppm sodium hypochlorite solution at ambient temperature for 48 hours, the chlorine treated membrane showed a improved pure water permeability of 141 gfd/psi, lake water permeability of 38 gfd/psi and sewage water permeability of 19 gfd/psi, respectively. The details are given in Table 1.

TABLE 1

| COMPOSITION OF MEMBRANE CASTING SOLUTION (DOPE I) | |
|---|---|
| Poly(vinylidene fluoride) (PVDF) | 13% |
| Polyvinylpyrrolidone (PVP) | 5% |
| Aluminum chloride hexahydrate ($AlCl_3.6H_2O$) | 5% |
| Poly(vinyl butyral-co-vinyl alcohol-vinyl acetate) | 2% |
| 1-Methyl-2-pyrrolidinone (NMP) | 75% |
| COATING CONDITION | |
| Dope Pressure | 80 psi |
| 1st coating | Dope I |
| 2ed coating | Dope I |
| Coagulation bath | Water, 50–55° C. |
| Primary leaching bath | Water, 50–55° C. |
| Secondary leaching bath | Water, ambient temperature |
| Coating speed | 60 ft/min |
| MEMBRANE CHARACTERISTICS | |
| Braid outside diameter | 63 ± 3 mil |
| Membrane outside diameter | 78 ± 3 mil |
| Burst pressure | 40 psi |
| Pure water permeability | 50 gfd/psi |
| Canobie Lake water permeability | 32 gfd/psi, permeate clear and potable |
| Sewage water permeability | 11 gfd/psi, permeate clear and dischargeable |
| Italian white wine: BELLA SERA | 26.3 gfd/psi, permeate sparkling white wine |
| French red wine: B & G MERLOT | 7.9 gfd/psi, permeate sparkling red wine |
| Lemon juice permeability | 1.1 gfd/psi, permeate clear |
| Orange juice permeability | 0.88 gfd/psi, permeate clear, bright yellow |
| Soymilk permeability | 0.79 gfd/psi, permeate clear, light yellow |
| Milk permeability | 0.77 gfd/psi, permeate clear |
| POST TREATMENT WITH 10,000 PPM NaOCl AT AMBIENT TEMPERATURE FOR 48 HOURS | |
| Water permeability | 141 gfd/psi |
| Canobie lake water permeability | 38 gfd/psi, permeate clear and potable |
| Sewage water permeability | 19 gfd/psi, permeate clear and dischargeable |

EXAMPLE 2

Effect of an Adhesive Coating Layer on Membrane Performance

In example 2, a braid was first coated with a proprietary adhesive, then coated with Dope I obtained from Example 1 using a spinneret displayed in FIG. 1 and a process depicted in FIG. 3 to give a composite hollow fiber membrane. The membrane was heated in an oven at 80° C. for 8 hours before use. The condition used to make the membrane is given in Table 2.

The composite hollow fiber membrane obtained has an outside diameter of 78 mil, a water permeability of 17 gfd/psi measured at 10 psi transmembrane pressure. A compressed air was applied from inside hollow fiber membrane to determine its burst pressure. The membrane ruptured at 82 psi to give a burst pressure of 82 psi. The membrane was further characterized by filtering whole milk to give a clear permeate and milk permeability of 1.2 gfd/psi.

A post treatment was carried out by immersing the membrane in a 10,000 ppm sodium hypochlorite solution at ambient temperature for 48 hours, the chlorine treated membrane showed a improved pure water permeability of 42 gfd/psi, lake water permeability of 18 gfd/psi and sewage water permeability of 8 gfd/psi. The details are shown in Table 2.

TABLE 2

| COMPOSITION OF MEMBRANE CASTING SOLUTION (DOPE I) | |
|---|---|
| Poly(vinylidene fluoride) (PVDF) | 13% |
| Polyvinylpyrrolidone (PVP) | 5% |
| Aluminum chloride hexahydrate (AlCl$_3$.6H$_2$O) | 5% |
| Poly(vinyl butyral-co vinyl alcohol-vinyl acetate) | 2% |
| 1-Methyl-2-pyrrolidinone (NMP) | 75% |
| COATING CONDITION | |
| Dope Pressure | 100 psi |
| 1$^{st}$ coating | Adhesive |
| 2$^{ed}$ coating | Dope I |
| Coagulation bath | Water, 50–55° C. |
| Primary leaching bath | Water, 50–55° C. |
| Secondary leaching bath | Water, ambient temperature |
| Coating speed | 60 ft/min |
| MEMBRANE CHARACTERISTICS | |
| Braid outside diameter | 63 ± 3 mil |
| Membrane outside diameter | 78 ± 3 mil |
| Burst pressure | 82 psi |
| Water permeability | 17 gfd/psi |
| Milk permeability | 1.2 gfd/psi |
| POST TREATMENT WITH 10,000 PPM NaOCl AT AMBIENT TEMPERATURE FOR 48 HOURS | |
| Water permeability | 42 gfd/psi |
| Canobie lake water permeability | 18 gfd/psi, permeate clear and potable |
| Sewage water permeability | 8 gfd/psi, permeate clear and dischargeable |

EXAMPLE 3

Effect of Adhesive Reinforcement on Membrane Performance

The composite hollow fiber membrane obtained from Example 1 was first filled with a proprietary adhesive formulated for strengthening the binding between the support and the membrane, then drained to remove the excess amount of adhesive from the membrane. The membrane was heated in an oven at 80° C. for 8 hours before use. The membrane obtained has the following characteristics as shown in Table 3.

TABLE 3

| MEMBRANE CHARACTERISTICS | |
|---|---|
| Braid outside diameter | 63 ± 3 mil |
| Membrane outside diameter | 78 ± 3 mil |
| Burst pressure | >100 psi |
| Water permeability | 20 gfd/psi |
| Milk permeability | 1.2 gfd/psi, permeate clear |
| POST TREATMENT WITH 10,000 PPM NaOCl AT AMBIENT TEMPERATURE FOR 48 HOURS | |
| Water permeability | 55 gfd/psi |
| Canobie Lake water permeability | 22 gfd/psi, permeate clear and potable |
| Sewage water permeability | 12 gfd/psi, permeate clear and dischargeable |

EXAMPLE 4

Effect of Multiple-Layer Coating on Membrane Performance

A membrane casting solution (Dope II) was prepared by dissolving 14 parts by weight of PVDF-HFP, 5 parts by weight of PVP, 5 parts by weight of aluminum chloride hexahydrate, and 2 parts by weight of Poly(acrylonitrile-co-vinylidene chloride-co-methylmethacrylate) in 74 parts by weight of NMP as a solvent. A composite hollow fiber membrane was prepared by first coating a tubular braid with Dope II, followed by coating with Dope II again using a spinneret shown in FIG. 1 and a process depicted in FIG. 3. The ultrasonic sonication was applied to the coagulation bath, primary and secondary leaching baths to speed up phase inversion process. The condition used to prepare a composite hollow fiber membrane is given in Table 4. The membrane obtained was characterized in the same way as in Example 1, and the results obtained are summarized in Table 4.

TABLE 4

| COMPOSITION OF MEMBRANE CASTING SOLUTION (Dope II) | |
|---|---|
| Poly(vinylidene fluoride-co-hexafluoropropylene) (PVDF-HFP) | 14% |
| Polyvinylpyrrolidone (PVP) | 5% |
| Aluminum chloride hexahydrate (AlCl$_3$.6H$_2$O) | 5% |
| Poly(acrylonitrile-co-vinylidene chloride-co-methylmethacrylate) | 2% |
| 1-Methyl-2-pyrrolidinone (NMP) | 74% |
| COATING CONDITION | |
| Dope Pressure | 100 psi |
| 1$^{st}$ coating | Dope II |
| 2$^{ed}$ coating | Dope II |
| Coagulation bath | Water, 50–55° C. |
| Primary leaching bath | Water, 50–55° C. |
| Secondary leaching bath | Water, ambient temperature |
| Coating speed | 100 ft/min |
| MEMBRANE CHARACTERISTICS | |
| Braid outside diameter | 63 ± 3 mil |
| Membrane outside diameter | 78 ± 3 mil |
| Burst pressure | 36 psi |
| 200 k PEO rejection | 90.0% |

TABLE 4-continued

| | |
|---|---|
| Water permeability | 26 gfd/psi |
| Lemon juice permeability | 0.96 gfd/psi, permeate clear |
| Orange juice permeability | 0.81 gfd/psi, permeate clear, bright yellow |
| Soymilk permeability | 0.69 gfd/psi, permeate clear, light yellow |
| Milk permeability | 0.72 gfd/psi, permeate clear |
| POST TREATMENT WITH 10,000 PPM NaOCl AT AMBIENT TEMPERATURE FOR 48 HOURS | |
| Water permeability | 51 gfd/psi |
| Canobie Lake water permeability | 27 gfd/psi, permeate clear and potable |
| Sewage water permeability | 10 gfd/psi, permeate clear and dischargeable |

Although the above illustration and discussion are focused on composite hollow fiber membrane, the formulations, methods and processes discovered in the present invention are applicable to flat sheet composite membranes, large diameter tubular composite membranes and any other composite membrane having a different geometry.

I claim:

1. A defect free semipermeable composite membrane having a burst pressure of 10 to 500 psi and a pure water permeability of 1–500 gfd/psi comprising:
   (i) a support layer which provides mechanical strength and is selected from the group consisting of extruded porous material, non woven material, woven material, braided material, knitted material, any other rigid or flexible organic or inorganic permeable material;
   (ii) a middle layer bonded to the support layer which covers the rough surface and defects of the support layer, said middle layer selected from the group consisting of an epoxy, a polyurethane, a silicone, and a combination thereof and provides binding between said support and said barrier layers; and
   (iii) a barrier layer which provides selective separation and coats the middle layer to provide a defect free membrane, said barrier layer consisting of 8–60% of at least one hydrophobic polymer, 1–40% of at least one hydrophilic polymer, 1–20% of an inorganic additive, 1–20% percent other organic additive, and solvent,
   wherein the middle layer provides binding between the support layer and the barrier layer.

2. The membrane of claim 1, wherein said composite membrane is in the form of a hollow fiber.

3. The membrane of claim 1, wherein said composite membrane is in the form of a tube.

4. The membrane of claim 1, wherein said composite membrane is in the form of a sheet.

5. The membrane of claim 1, wherein said composite membrane is in the form of a sphere.

6. The membrane of claim 1, wherein said membrane has a burst pressure of about 35 to at least 100 psi, and a pure water permeability of about 20 to 150 gfd/psi at 10 psi transmembrane pressure.

* * * * *